Aug. 10, 1965 T. C. J. CASTON 3,199,243
HOOK ROD AND LINE HOLDER COMBINED
Filed July 19, 1963 2 Sheets-Sheet 1
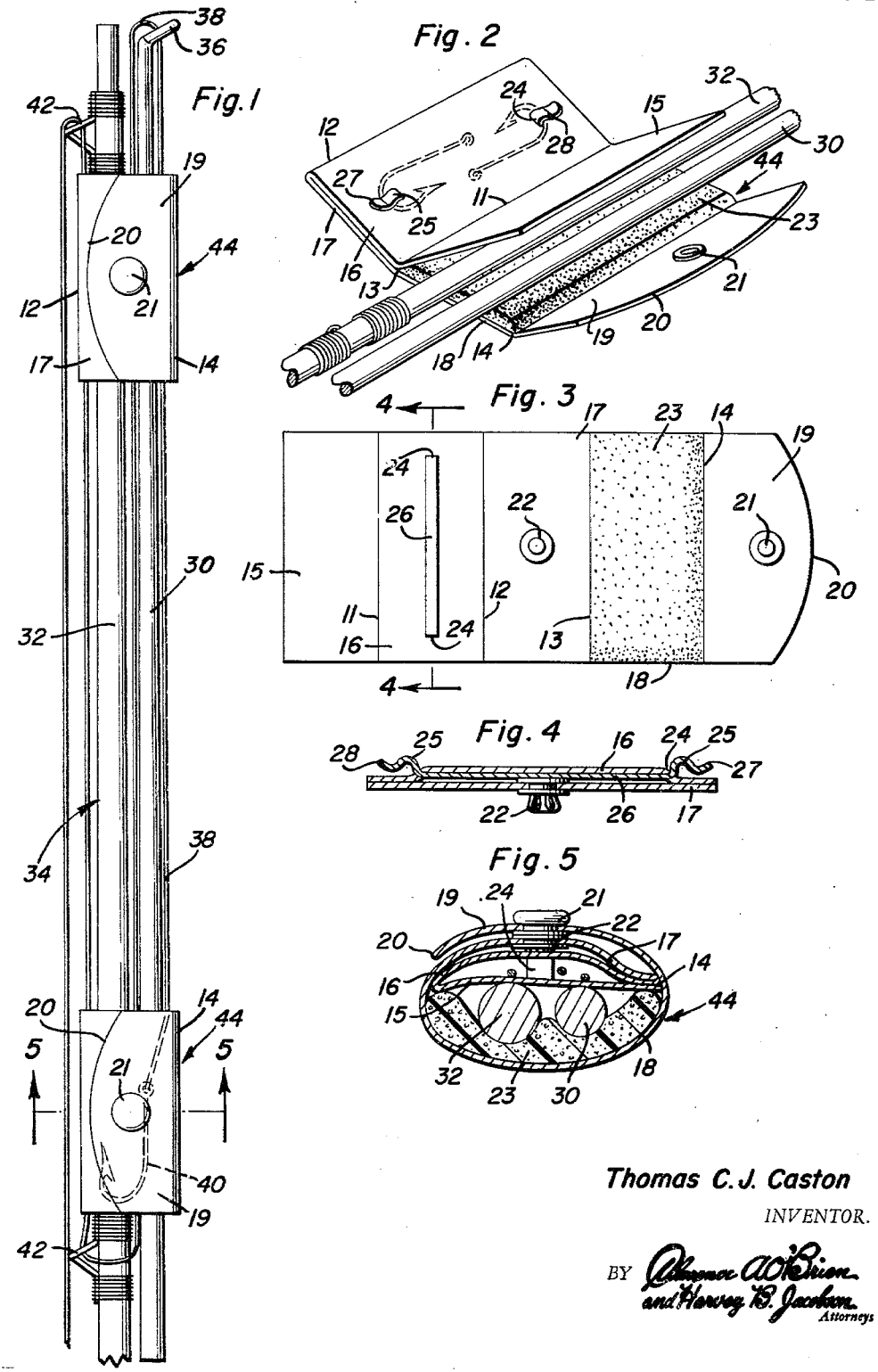
Thomas C. J. Caston
INVENTOR.

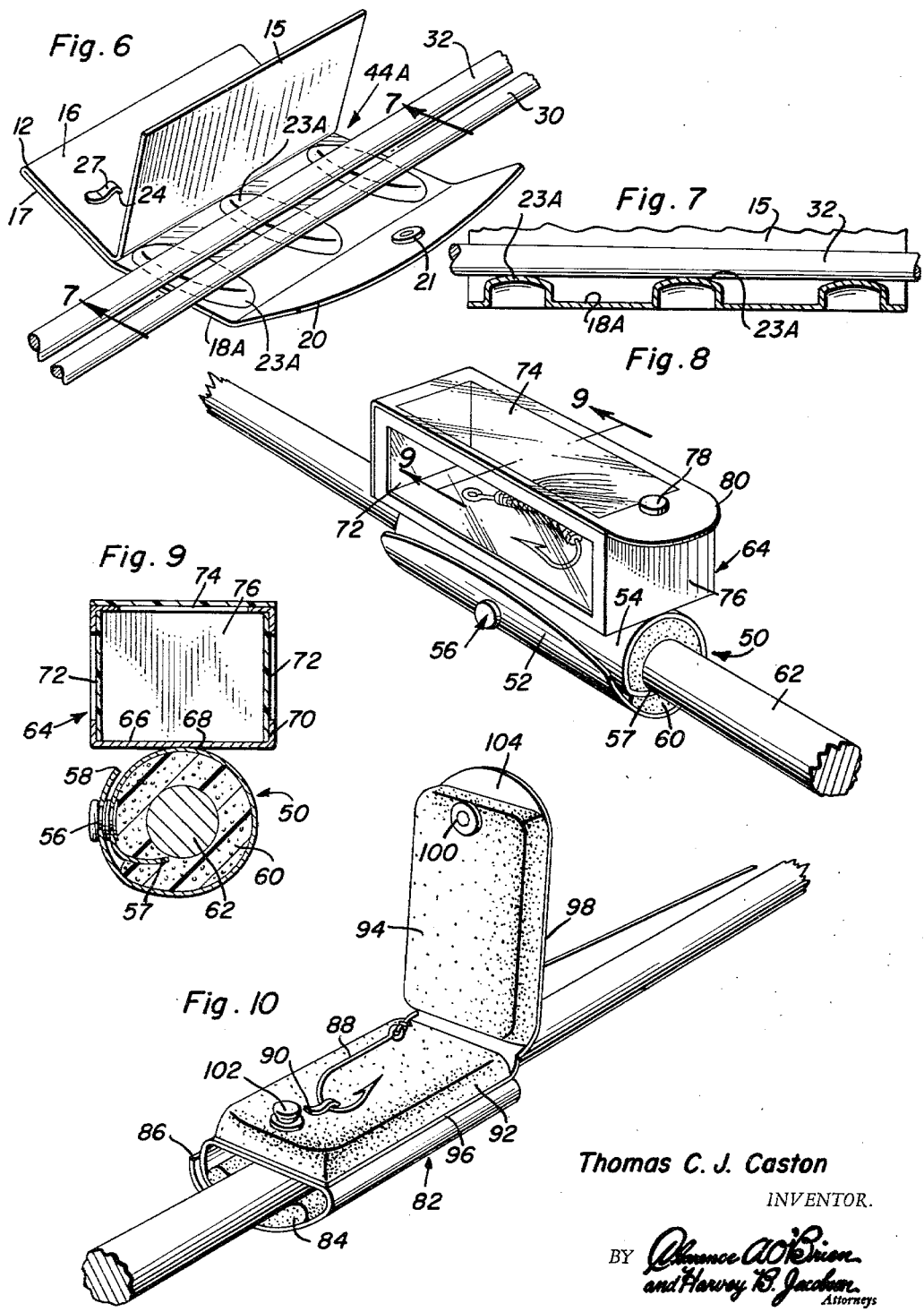

United States Patent Office 3,199,243
Patented Aug. 10, 1965

3,199,243
HOOK ROD AND LINE HOLDER COMBINED
Thomas C. J. Caston, 3515 Lexington Ave., Dallas 5, Tex.
Filed July 19, 1963, Ser. No. 296,233
4 Claims. (Cl. 43—26)

The present invention relates to a dual purpose holder for a fishing rod and line and fishook thereon more particularly, a holder which is readily attachable to and removable from the fishing rod and which embodies self-contained means which protectively safeguards the hook and rod and prevents troublesome displacement and tangling of the line when not being used.

It is common practice to carry a number of selectively usable fishing rods and fly rods when one goes fishing. Unless the extra rods, hooks and lines are unstrung and carefully stored in the tackle box when they are not in use the angler, more frequently than not, may be confronted with entangled hooks, lines and rods when they are next brought out for use. Experience has shown that an angler may be called upon to devote hours to tedious untangling difficulties.

Briefly, the present invention comprises a simple attachment type holder having means for protectively encasing at least one fishook and a portion of the fishing line which is attached thereto, and means for mounting the holder on a fishing rod and wherein the latter means is wrapped around and saddled on the section of the rod in a manner to perform the function of the rod holder.

More particularly, the invention pertains to a readily attachable and detachable protective case which is made of pliable leatherette or equivalent easy-to-fold sheet material, said case having the general appearance of a small keycase and being characterized by a padded portion which when saddled on is thus protectively wrapped around the side-by-side sections of the fishing rod and in combination therewith, a shielded snap-retained flap-equipped portion with selectively usable resilient clips which function to accommodate the temporarily attached and protectively guarded fishook.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view showing a sectional fishing rod with two sections thereof side-by-side and wrapped or bundled and held by the herein disclosed novel holder, two such holders being here shown;

FIGURE 2 is a view in perspective of either one of the holders illustrated in FIG. 1 and wherein the holder is shown by itself and the selectively attachable fishhooks appear in dotted lines;

FIGURE 3 is a plan view of the leatherette or equivalent plastic rectangular blank with foldlines identifying the plurality of similar rectangular folds or foldable members which go to make up the finished holder shown in FIG. 1;

FIGURE 4 is a view on an enlarged scale taken on the section line 4—4 of FIG. 3;

FIGURE 5 is an enlarged cross-section with parts in elevation taken on the plane of the section line 5—5 of FIG. 1;

FIGURE 6 is a view which corresponds with FIG. 5 and which shows a modified cushion for the rod sections;

FIGURE 7 is an enlarged sectional view taken on the section line 7—7 of FIG. 6;

FIGURE 8 is a view in perspective showing a fragmentary portion of a fishing rod and illustrating a modified form of the invention wherein the top holder is suitably designed to handle not only a fishhook or hooks but a lure, plug or equivalent artificial bait;

FIGURE 9 is an enlarged cross-section on the section line 9—9 of FIGURE 8; and

FIGURE 10 is a view in perspective similar to FIG. 8 and showing a fourth form of the invention.

Directing attention first to FIGS. 1 to 5, inclusive, and particularly to the ready-to-fold blank in FIG. 3, this blank is rectangular when in spread form. The spaced parallel foldlines ranging from left to right are denoted at 11, 12, 13 and 14 and define the five distinguishable component parts or members 15, 16, 17, 18 and 19, respectively. The free edge of the member 19 is curved as at 20 and the median portion is provided with a female snap fastener 21 to accommodate a properly anchored and cooperating male snap fastener 22 exposed for use on the median portion of the central fold or member 17. The face of the member 18 is provided with protective cushioning means which in this specific illustration comprises a compressibly resilient foam rubber or an equivalent pad 23.

These component parts 15 to 19 are also herein referred to as cooperating hingedly joined panel-like members. The panel member 16 is provided adjacent its transverse ends with slots 24 which permit passage therethrough of the bent end portions 25 of a metal strap 26. The end portions pass through the slots and the terminal end portions are suitably fashioned into hook-type clips 27 and 28 which are selectively used (FIG. 2) for temporary anchorage thereon of the hook and line which is to be encased and safeguarded. With this construction it will be evident that when the folder-like case is completed and ready for use the panel-like members assume the cooperative positions illustrated in the finished product in FIG. 2. It will be evident from FIG. 2 that the panel member 15 at one end provides a shield-like flap and the tongue-like one at the other end, that is the member 19 provides a wrap-around and closing flap. It will be evident that the overlapping surfaces of the two panel members 16 and 17 are fastened together by adhesive media or glue so that these two members constitute a single panel.

It is evident that the sponge rubber insert 23 constitutes a protective pad and lends itself to adoption and use in the manner illustrated in FIG. 5. FIG. 4 shows the two panel members 16 and 17 and how the strip member 26 is sandwiched therebetween and how the terminal ends are fashioned into selectively usable clips for the fishhook.

In FIG. 1 one fishing rod section is denoted at 30 and the companion one at 32 these sections representing the fishing rod 34. The fixed line guide 36 is illustrated at the forward or outer end of the section 30 and the portion 38 of the fishing line is passed therethrough, this being the free end portion 38 which is shown in FIG. 1 as provided on its terminal end portion with a conventional fishhook 40. The sections 30 and 32 are disposed in side-by-side relationship and portions of the fishing line are threaded slidingly through line guides 42. It is evident that this multipurpose holder is denoted by the numeral 44. Two such holders can be applied and thus wrapped around the rod sections 30 and 32 in order to bundle them together while permitting the fishing line to remain rigged and ready for use with the fishing hook concealed and confined between the panel-like member 16 and free flap-like shield 15. It follows that in addition to holding the rod sections together when the flap 19 is closed and snap-fastened the holder functions in combination with the rod sections and also the line and hook.

Except for the protective cushioning means 23 it will be evident, by comparison, that the dual purpose holder depicted in FIGS. 6 and 7 and designated generally by the numeral 44a is otherwise the same as the holder or folder 44. Under the circumstances it is not being treated here as a modification except in the very limited sense that the panel member thereof which is denoted at 18a instead of having the cushioned pad 23 has molded or blister-like bosses 23a which are sufficiently pliant or pliable that they serve in lieu of the cushion 23. Consequently the remaining component parts are identified by the same reference numeral as seen in FIG. 2, for example.

With reference to the modification illustrated in FIGS. 8 and 9 this adaptation may also be construed as a rod holder and hook and line holder. On the other hand it may be regarded as a bait holder with rod attaching means. In any event the sleeve-like attaching member is denoted (FIGS. 8 and 9) by the numeral 50 and it comprises a wrap-around sleeve the overlapping end portions of which are denoted at 52 and 54, suitable snap-fastener means being provided, generally denoted at 56. The end portions of the leatherette or equivalent wrapper are denoted in FIG. 9 for sake of distinction by the numerals 57 and 58. Suitable compressibly resilient padding is attached to the interior surface of the sleeve and is denoted at 60 and protectively embraces the fishing rod 62. The hook or lure holder here is denoted generally by the numeral 64 and is of box-like construction, the bottom wall 66 being perched or superimposed atop the sleeve and securely joined thereto at 68. The side walls 70 are provided with transparent panels 72. The top wall is also primarily transparent and designated by the numeral 74. The end walls 76 may be non-transparent. The top wall provides a cover or closing flap and is held closed by snap fastener means 78 and terminates in a pull-tab 80 for easy opening. The holder here may be conveniently used for a plug, hook-equipped lure or other artificial bait in the manner suggested in FIG. 8.

The same principle is illustrated in the modification depicted in FIG. 10 wherein the wrap-around sleeve 82 is saddled or mounted on the rod and is provided interiorly with appropriate padding means 84. Any appropriate fastening means (not detailed) may be employed for closing the end flap 86. Here the fishhook 88 is shown detachably connected to a hook-like clip 90 and it is sandwiched between two appropriately constructed pads 92 and 94 glued in place as at 96 and 98, the latter part being equivalent to the aforementioned closing flap and having a snap fastener 100 to engage the cooperating snap fastener 102 and being further provided at its free end with a fingergripping pull 104.

When a rod has been broken down it is not necessary for the line to be removed from the line guides. It is simply turned end to end in a bundle and my guard is snapped around the entire bundle, hook, rod sections and all lines are protected. One holder is snapped around the sections near each end. Another thing is that the guard has a hook holder in each end and no matter how the guard is held, upside down, with the right hand or the left it is always in position to snap onto the hook and rod. This is very important to non-mechanical minded anglers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combined fishing rod, line and hook holder comprising a flexible case having a flap panel member having a snap fastening element on an inner face thereof, said flap panel member being hingedly attached along one edge thereof to a second panel member, said second panel member having an inner face having a resilient pad thereon, a third panel member hingedly attached to said second panel member along a second edge spaced from and parallel to said one edge, a fourth panel member hingedly attached to and overlying said third panel member in face-to-face relation therewith, the third panel member having an exposed face having a second snap fastening element thereon adapted to be engaged by the first fastening element to maintain the case in a closed condition, the fourth panel member having an exposed face having a fishhook attaching clip mounted thereon, and a fifth panel member hingedly attached to the fourth panel member along an edge of said fourth panel member opposite the edge to which the third member is hingedly attached thereto, the fifth member being adapted to be placed in overlying relation with the exposed face of the fourth panel member to protect a fishhook mounted in said clip whereby separated sections of a fishing rod may be mounted between the resilient pad of the second panel and the exposed face of the fifth panel while said fifth panel shields a fishhook having a line attached thereto and to said rod sections when said case is placed in closed position about the rod sections.

2. The combination recited in claim 1 and wherein said second, third, fourth and fifth panel members comprise congruent rectangles and are hingedly attached along the longer edges thereof.

3. The combination recited in claim 1, and wherein said pad is characterized by a plurality of compressibly resilient embossments cooperatively oriented and constituting rod seating and protecting means.

4. The combination recited in claim 2 and wherein the fourth panel member has a pair of spaced parallel relatively short slots therethrough, said slots extending parallel to and being located intermediate the ends and adjacent to each of the shorter edges of said member, and wherein the fishhook attaching clip comprises a flat bar extending between said parallel slots, said bar having end portions extending through each of said slots and further fishhook engaging end portions extending toward each of said adjacent edges whereby when the case is placed in said closed position, the face-to-face relation of the third and the fourth panel members will maintain the fishhook attaching clip with the bar touching one face of the fourth panel member and the hook engaging end portions of the bar touching the other face thereof.

References Cited by the Examiner

UNITED STATES PATENTS

| 848,139 | 3/07 | Stuppar. | |
| 891,055 | 6/08 | Frost | 43—57.5 |
| 1,623,429 | 4/27 | Martinson | 43—57.5 |
| 1,736,343 | 11/29 | Hawes | 43—57.5 |
| 2,285,888 | 6/42 | Benton. | |
| 2,767,502 | 10/56 | Reynolds | 43—25.2 |
| 2,849,825 | 9/58 | Reisner | 43—25.2 |

ABRAHAM G. STONE, *Primary Examiner.*

JOSEPH S. REICH, *Examiner.*